United States Patent
Ticknor

(10) Patent No.: US 7,025,879 B1
(45) Date of Patent: Apr. 11, 2006

(54) RAINWATER COLLECTION APPARATUS AND PUMPING SYSTEM

(76) Inventor: Martin F. Ticknor, 19 Itchabad La., Whitney Point, NY (US) 13862

( * ) Notice: Subject to any disclaimer, the term of this patent is extended or adjusted under 35 U.S.C. 154(b) by 96 days.

(21) Appl. No.: 10/798,543

(22) Filed: Mar. 12, 2004

(51) Int. Cl.
*B01D 29/00* (2006.01)
*B01D 29/92* (2006.01)

(52) U.S. Cl. ............. 210/232; 210/416.1; 210/474; 222/189.11

(58) Field of Classification Search ........... 210/232, 210/416.1, 473, 474; 222/189.11, 189.06
See application file for complete search history.

(56) References Cited

U.S. PATENT DOCUMENTS

| | | | | |
|---|---|---|---|---|
| 1,559,941 A | * | 11/1925 | Demaree | 210/422 |
| 1,609,867 A | * | 12/1926 | Eisenhauer | 210/257.1 |
| 2,439,633 A | * | 4/1948 | Reinhart | 210/525 |
| 3,962,084 A | * | 6/1976 | Nussbaum | 210/747 |
| 4,317,733 A | * | 3/1982 | Xhonneux | 210/752 |
| 4,337,858 A | * | 7/1982 | Thomas et al. | 206/5.1 |
| 4,615,153 A | | 10/1986 | Carey | |
| 4,919,165 A | | 4/1990 | Lloyd | |
| 4,925,099 A | * | 5/1990 | Owen | 239/289 |
| 4,976,442 A | | 12/1990 | Treadway | |
| 5,234,585 A | * | 8/1993 | Zuk, Jr. | 210/188 |
| 5,259,166 A | | 11/1993 | Carey, II et al. | |
| 5,301,474 A | | 4/1994 | Carey, II et al. | |
| 5,533,303 A | | 7/1996 | Harvey | |
| 5,873,383 A | | 2/1999 | Takai et al. | |
| 6,264,832 B1 | | 7/2001 | Panahi | |
| 6,436,283 B1 | | 8/2002 | Duke | |
| 6,818,127 B1 | * | 11/2004 | Ketrow | 210/170 |
| 2001/0035371 A1 | * | 11/2001 | Priggemeyer et al. | 210/162 |
| 2002/0008065 A1 | * | 1/2002 | Elston | 210/605 |
| 2004/0168992 A1 | * | 9/2004 | Ben-Amotz | 210/805 |
| 2005/0184007 A1 | * | 8/2005 | Allard et al. | 210/512.2 |

FOREIGN PATENT DOCUMENTS

| | | | |
|---|---|---|---|
| DE | 4036598 | * | 11/1990 |
| DE | 19860860 | * | 7/2000 |
| GB | 2256155 | * | 12/1992 |
| GB | 2314367 | * | 12/1997 |
| JP | 6-346491 | * | 12/1994 |

* cited by examiner

*Primary Examiner*—Fred G. Prince
(74) *Attorney, Agent, or Firm*—John D. Gugliotta; Olen L. York, III

(57) ABSTRACT

A rainwater collection apparatus stores rainwater until required, and includes at least one outlet for exporting rainwater. The outlet or outlets include ball-valve assemblies and levers for opening and closing the outlets, and couplers for attachment to a garden hose, thereby providing optimal control of the export of water. An overflow port or outlet is provided as well. A drainage port at an inferior end is provided to remove sediment. To aid in the usage and distribution of the water, an internal submersible pump may be provided. The output of the pump is connected to a conventional garden hose allowing the rain water from the barrel to be used for washing of motor vehicles, watering of lawns and flowers, rinsing of driveways and the like. The pump is controlled by an ON-OFF switch located on the side of the barrel.

11 Claims, 5 Drawing Sheets

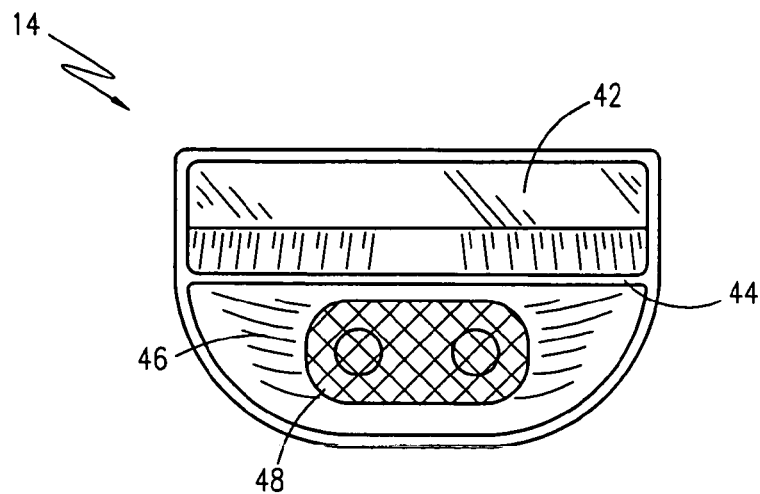
*Fig. 4*
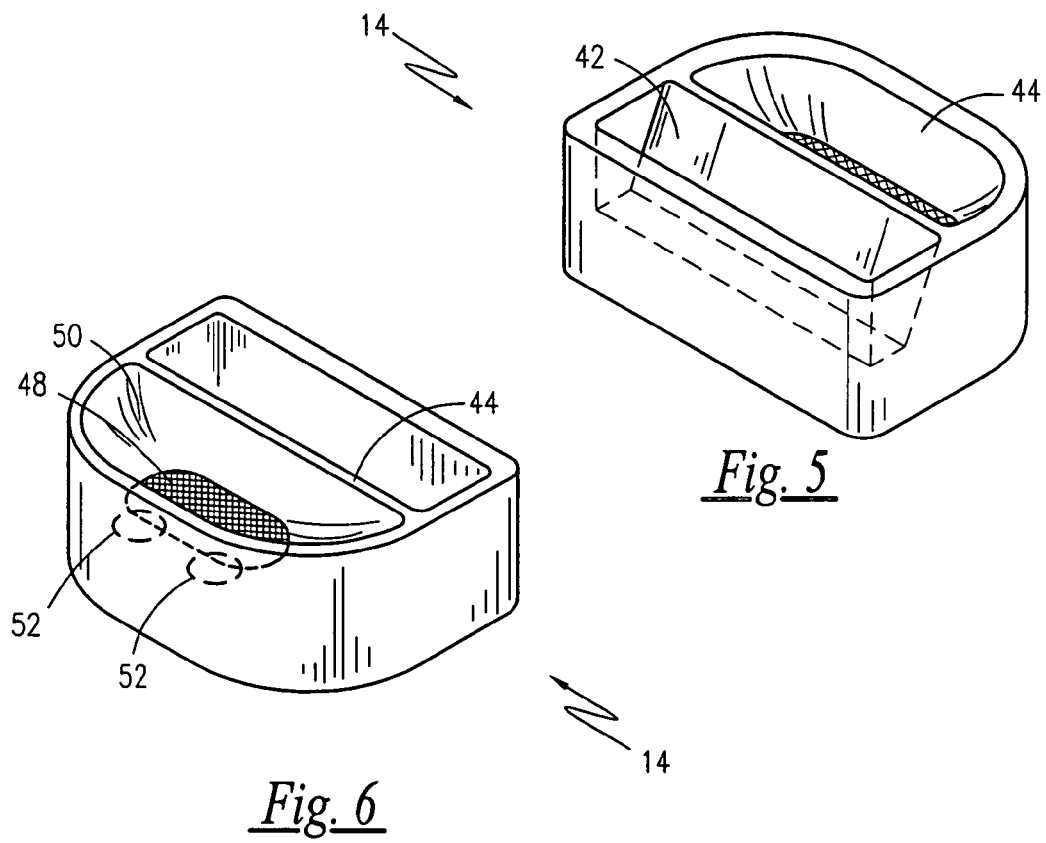
*Fig. 5*
*Fig. 6*

RAINWATER COLLECTION APPARATUS AND PUMPING SYSTEM

RELATED APPLICATIONS

The present invention contains subject matter that was first described in Disclosure Document Registration 539,109 filed on Sep. 24, 2003 under 35 U.S.C. §122 and 37 C.F.R. §1.14. As such, it is respectfully requested that said Disclosure Document remain a permanent part of the file history of the present application and be relied upon during the pending prosecution, and for any other matters that may arise.

There are no previously filed, nor currently any co-pending applications, anywhere in the world.

BACKGROUND OF THE INVENTION

1. Field of the Invention

The present invention relates generally to a rainwater collection apparatus and, more particularly, to a rainwater collection apparatus with plural outlets and a submersible pump for export or evacuation of water, and a drainage port for exporting sediment.

2. Description of the Related Art

Many homes and communities rely on cisterns for storing collected water. A cistern is basically a container for holding rain water runoff from roofs and other horizontal surfaces. While this water is usually not used for personal consumption, it is ideal for other tasks not requiring potable water such as irrigation, washing cars, rinsing driveways, and the like. However, the typical cistern that collects roof rain water usually only has a removable lid which allows a person to dunk a pail inside to fill it. As such, it is not easy or even handy for use for everyday chores, thus such rain water is left unused, while the municipal or well system is used for water. Accordingly, there is a need for a means by which rain water can be not only captured and stored, but used in an easy and effective manner, thus promoting water conservation and recycling.

A search of the prior art did not disclose any patents that read directly on the claims of the instant invention; however, the following references were considered related:

U.S. Pat. No. 6,436,283, issued in the name of Duke, discloses a portable rainwater collecting and purifying system;

U.S. Pat. No. 6,264,832, issued in the name of Panahi, discloses an apparatus for treating rainwater, the apparatus having a stop tank and a treatment cycle;

U.S. Pat. No. 5,873,383, issued in the name of Takai et al., discloses a water storing and dispensing apparatus comprising three tanks and control means for emptying the apparatus;

U.S. Pat. No. 5,533,303, issued in the name of Harvey, discloses a down spout water conservation adaptor installed on a down spout for selectively diverting water flow from the down spout outwardly;

U.S. Pat. Nos. 5,301,474 and 5,259,166, each issued in the name of Carey, II, et al., discloses a method and system for applying a water gathering and channeling roof onto the roof of an existing building;

U.S. Pat. No. 4,976,442, issued in the name of Treadway, discloses an arrow with a removable transmitter for emitting a perceptible radio signal;

U.S. Pat. No. 4,919,165, issued in the name of Lloyd, discloses an irrigation system control apparatus having a float that communicates with an electrical control switch to actuate an electric pump for discharging collected water; and U.S. Pat. No. 4,6147,153, issued in the name of Carey, discloses a leader or down spout filter for preventing entry of leaves and debris that may obstruct the down spout conduit.

Consequently, there is a need for an improved rainwater collection apparatus and system.

SUMMARY OF THE INVENTION

It is therefore an object of the present invention to provide a rainwater collection apparatus with an operatively coupled pump for exporting water therefrom.

It is a feature of the present invention to provide an apparatus with a removably attachable intake for acting as a filter and inhibit debris from ingress to a reservoir used for storing collected rainwater. The intake is attachable to the reservoir.

It is another feature of the present invention to provide an apparatus with a overflow ports to allow excessive rainwater to overflow from the reservoir in a controlled manner.

It is another feature of the present invention to provide an apparatus with a first outlet for exporting stored rainwater therefrom, the first outlet having a ball-valve assembly and a lever for mechanical actuation of export, and with a male style hose coupling for connection with a garden hose.

It is another feature of the present invention to provide an apparatus with a second outlet for exporting water therefrom, the second outlet having a ball-valve assembly and a lever for mechanical actuation of export, and with a male style hose coupling for connection with a garden hose.

It is another feature of the present invention to provide an apparatus with a drainage port and a corresponding drainage plug for allowing mechanical actuation of removing sediment or water therefrom.

Briefly described according to one embodiment of the present invention, a rainwater collection apparatus operatively coupled with a pump is a reservoir positioned under a roof down-spout, which is typical of conventional cisterns. A lid is provided to keep foreign matter out. An overflow port or outlet is provided as well. At the bottom of the barrel, a drain fitting is provided to allow for winterization, cleaning or the like. To aid in the usage and distribution of the water, an internal submersible pump is provided. The output of the pump is connected to a conventional garden hose allowing the rain water from the barrel to be used for washing of motor vehicles, watering of lawns and flowers, rinsing of driveways and the like. The pump is controlled by an ON-OFF switch located on the side of the barrel. The use of the apparatus provides an easy means of using rain water from a cistern, thus promoting water conservation in a manner which is easy, cost-effective and efficient.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

FIG. 4 is a top view of the intake;

FIG. 5 is a rear perspective of the intake;

FIG. 6 is a front perspective of the intake; and

DESCRIPTION OF THE PREFERRED EMBODIMENTS

Figure 1:
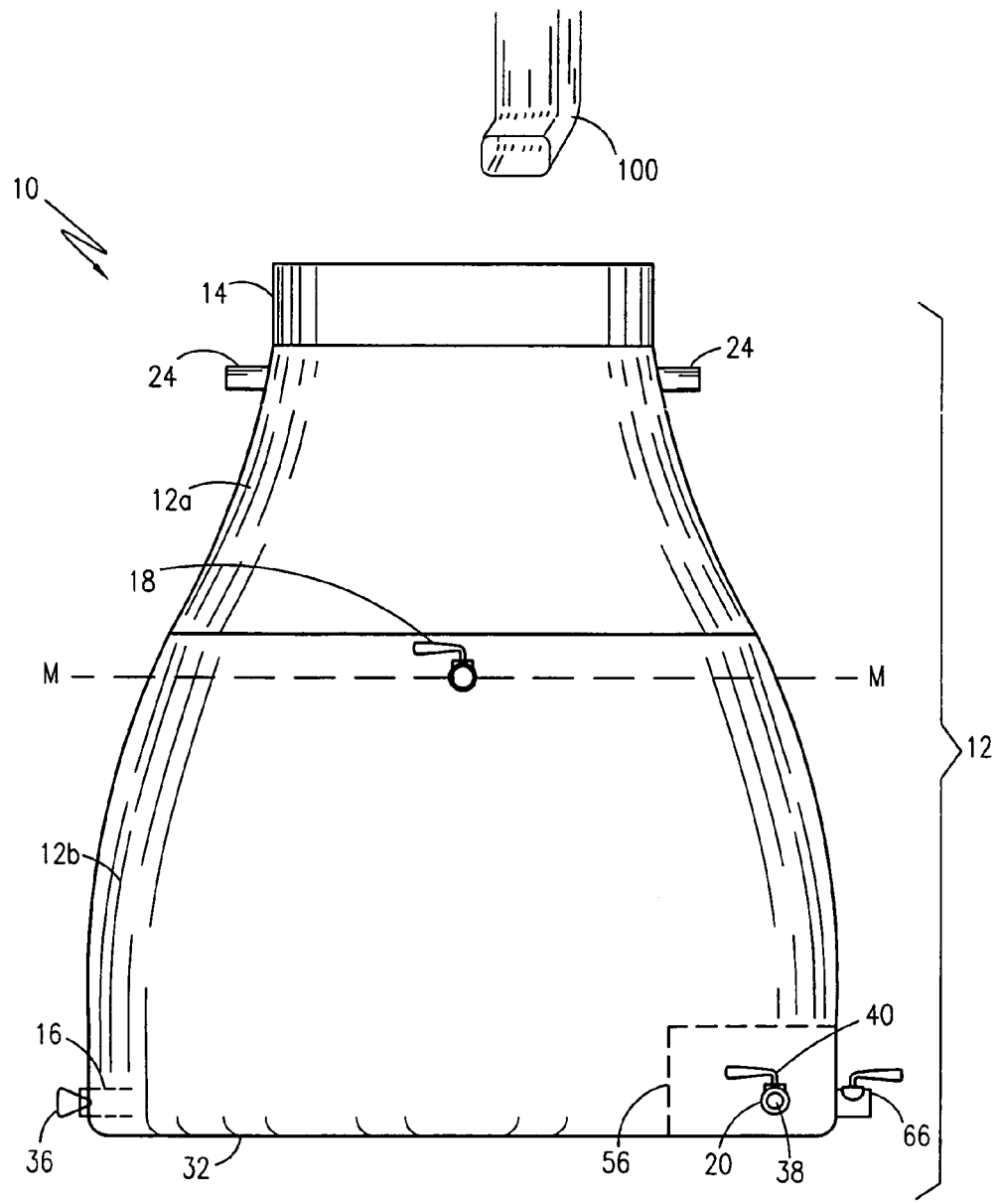
FIG. 1 is a front view of a rainwater collection apparatus.

The best mode for carrying out the invention is presented in terms of its preferred embodiment, herein depicted within the FIGS. 1–7.

1. Detailed Description of the Figures

Referring now to FIG. 1 through FIG. 7, a rainwater collection apparatus 10 is shown in accordance with a preferred embodiment of the present invention. The apparatus 10 comprises a reservoir 12 and a removable intake 14. The reservoir 12 includes a drainage port 16 and a first outlet 18. The reservoir 12 may also include a second outlet 20 for exporting water or potentially working in combination with drainage port 16. The apparatus 10 may further comprises a pump 22 either submersible within the reservoir 12 or independent of the reservoir 12, operatively coupled with the reservoir 12 to pump water from the reservoir 12 through the second outlet 20. The apparatus 10 may also include at least one (or more) overflow ports 24 provided to permit overflow rainwater to egress from the reservoir 12 in a controlled manner.

The reservoir 12 may comprise a variety of polygonal body shapes, including a cylinder (or drum) shape, an orthogonal shape or a non-uniform shape as depicted in the figures (wherein the inferior end of the reservoir 12 is wider than the superior end). The reservoir 12 comprises a superior end 26, an opposing inferior end 28 and an external surface 30 intermediately disposed between the ends 26 and 28. The ends 26 and 28 and the external surface 30 define a storage volume, the inferior end 28 bound by a base 32, the superior end 26 unbound and providing an opening for the ingress of rainwater. At least one overflow port 24 (two being shown in the figures) is provided adjacent the superior end 26, the ports 24 allowing for excess or overflow rainwater collected by the reservoir 12 to egress from the reservoir 12 in a controlled manner. A drainage port 16 is positioned adjacent to the inferior end 28 to permit drainage of water and sediment therefrom. The drainage port 16 includes a corresponding plug 36 that is threaded into the port 16, or inserted into the port 16 by frictional interference fit impingement, the plug 36 capable of withstanding water pressure generated by the volume stored in the reservoir 12 (envisioned to be as much as 80 gallons).

Figure 2:
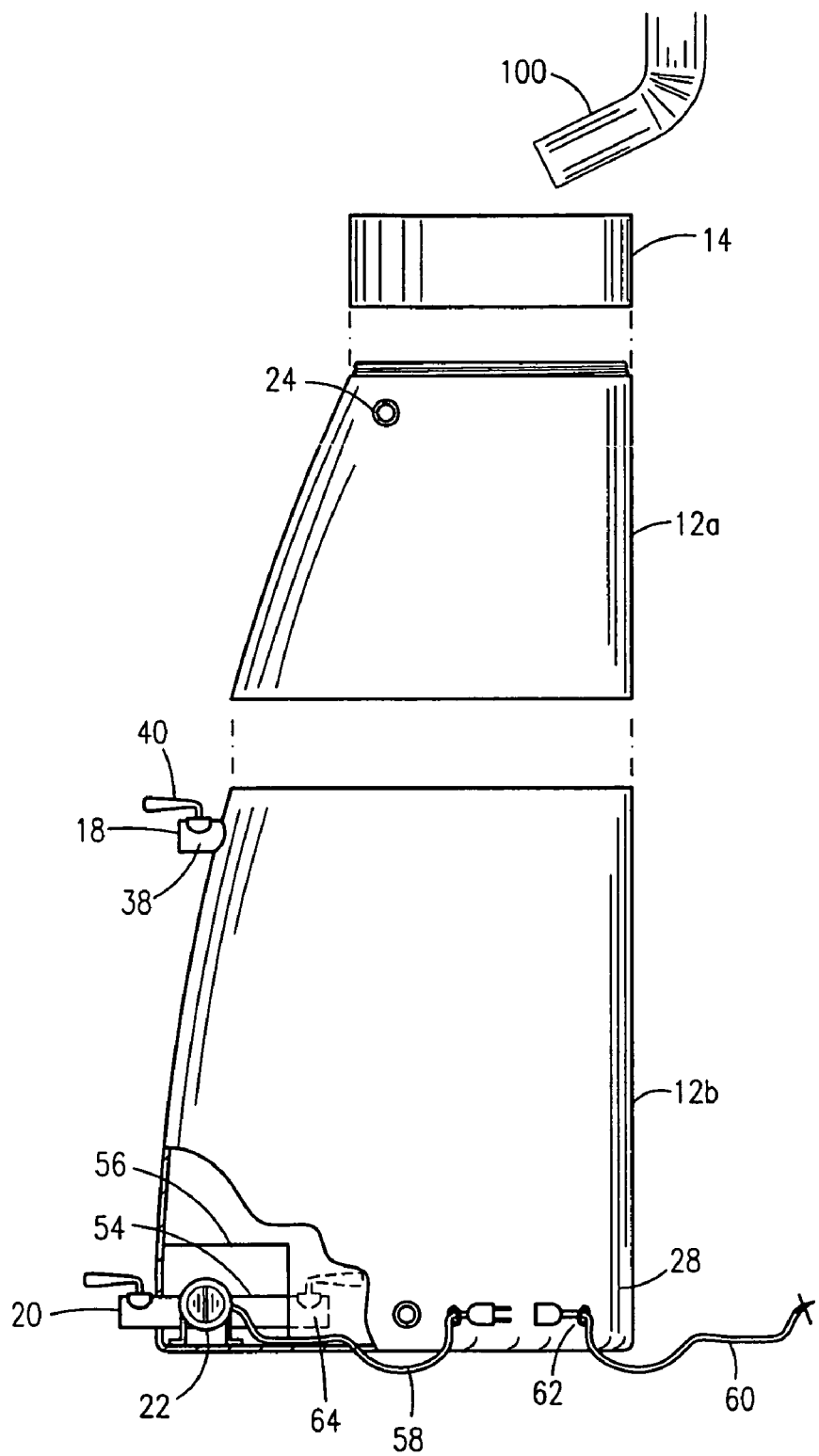
FIG. 2 is an exploded side view of the apparatus depicting a pump coupled to a sediment valve.
Figure 3:
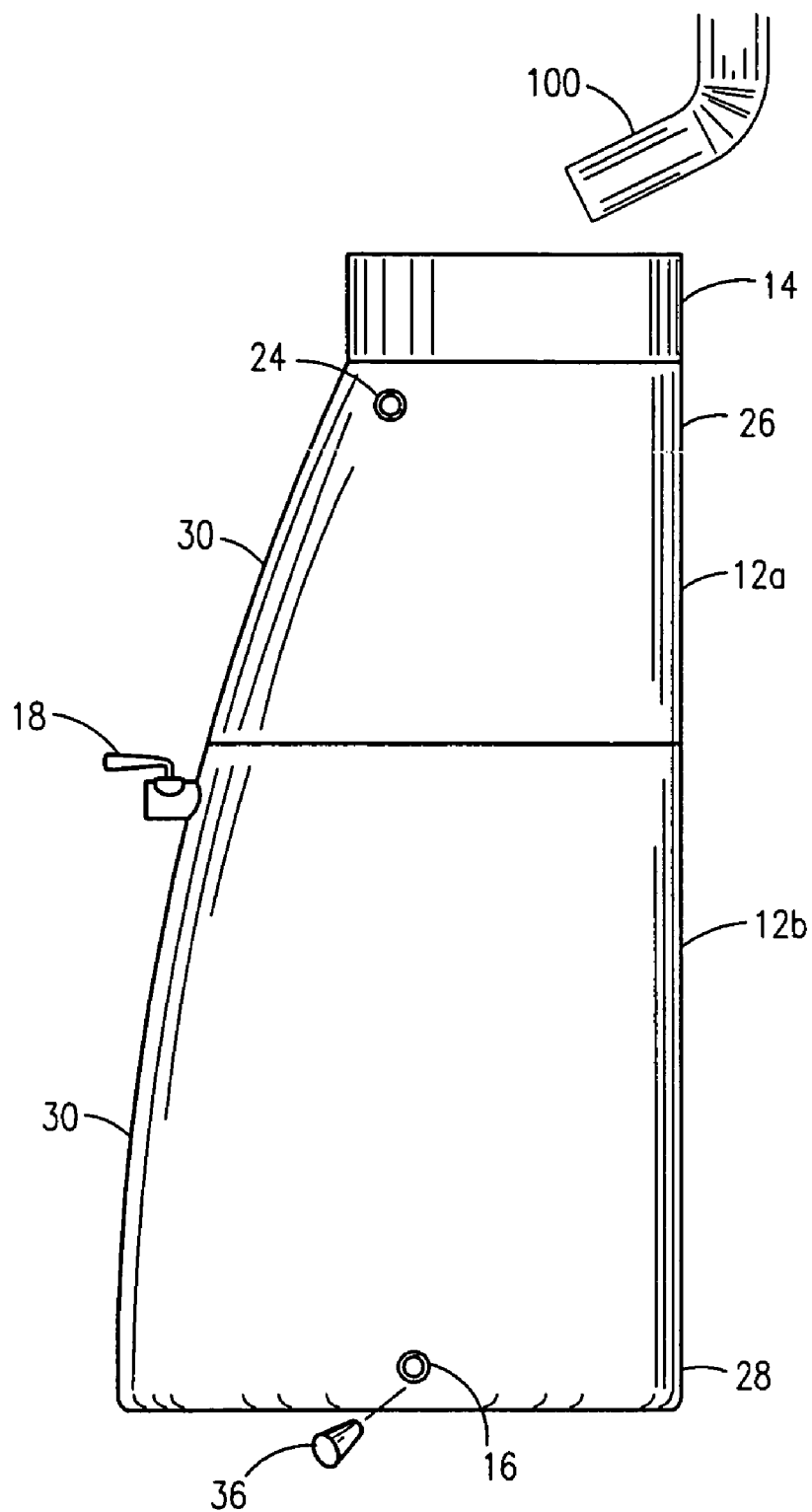
FIG. 3 is an alternate embodiment of the apparatus shown in FIG. 2, substituting a drainage port and plug for the sediment valve and pump.
Figure 7:
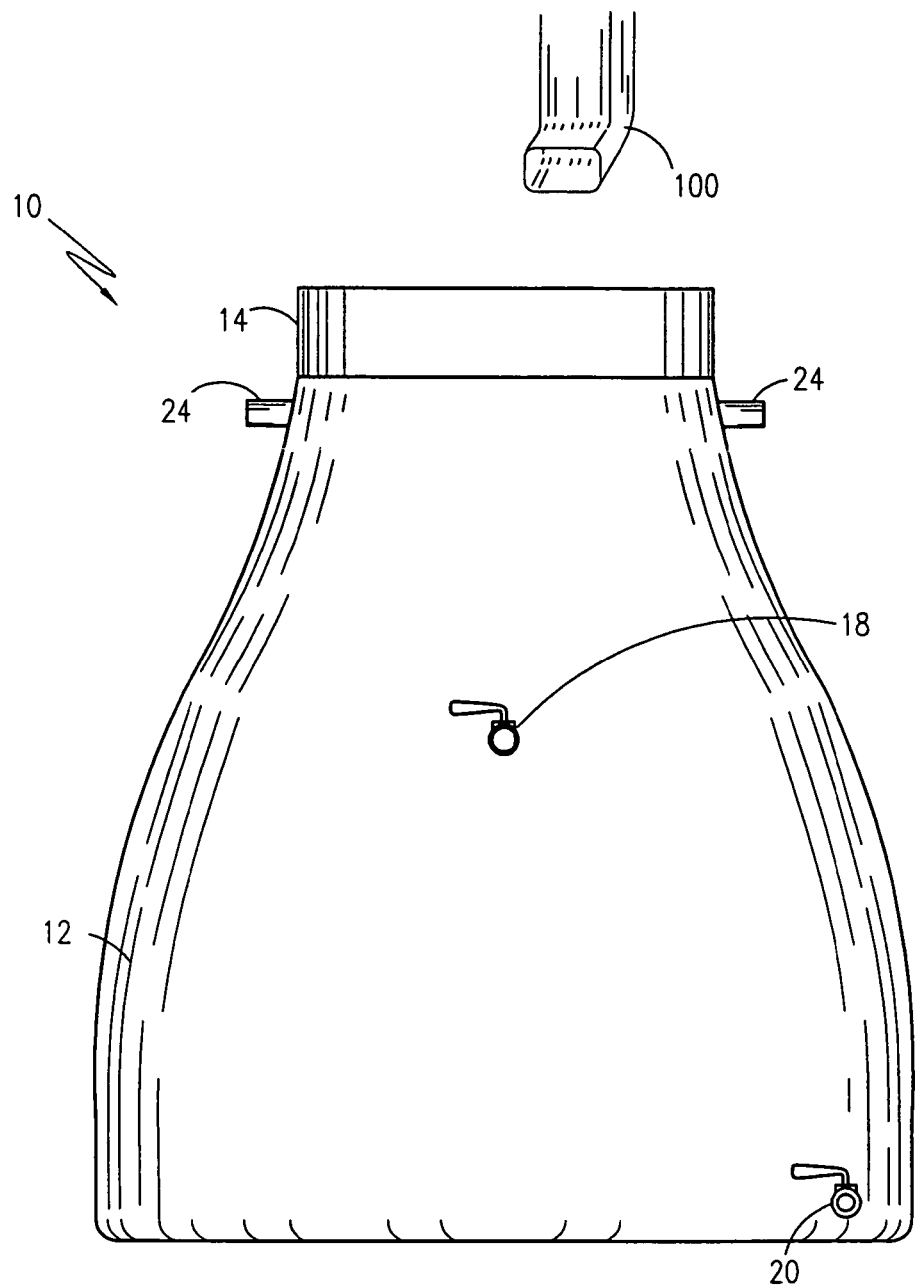
FIG. 7 is a front view of an alternate embodiment of the rainwater collection apparatus having an integral reservoir.

The reservoir 12 is envisioned as having an integral (FIG. 7) or modular configuration (FIG. 1 through FIG. 3). The modular configuration of the reservoir comprises an upper section 12a and a lower section 12b. The upper section 12a is superior to and may rest or be affixed to the lower section 12b by a variety of means, including the use of clamps, impingement, threading or other similar means.

A second outlet 20 may also be provided, the second outlet 20 positioned adjacent to the inferior end 28 to permit drainage of water therefrom. The second outlet 20 includes a ball-valve assembly 38 with a lever 40 for opening and closing the ball-valve assembly 38. It is envisioned that the ball-valve assembly 38 (of the second outlet 20 and the first outlet 18 described in further detail below) comprises a plastic assembly and the lever 40 comprises a metal construction to ensure accuracy in releasing stored rainwater and increasing the durability and life span of the lever 40. Coupled to the ball-valve 38 assembly is a standard size male-style garden hose attachment (envisioned to accommodate garden hoses from 0.5 inches (½") to 0.625 inches (⅝") in diameter having a threaded external surface for receiving an internally threaded coupling of the hose 100. The pump 22 is operatively coupled (via a hose 54) so as to expedite the exporting of water collected in the base 32 through the second outlet 20. The pump 22 is envisioned as submersible with the reservoir 12 (in a compartment 56) or independently external to the reservoir 12 so long as the pump 22 is easily removable and serviceable. The pump 22 may be stored in a compartment in the reservoir 12, with the power supply 58 exiting an aperture in the external surface 30 of the reservoir 12 (preferably opposite the first outlet 18 and the second outlet 20, thereby allowing the power supply to connect to an external electrical outlet or extension 60 from the outlet. The power supply 58 and/or the extension 60 may be neatly supported by the reservoir 12 by hangers, hooks 62 or other similar means. The pump 22 is envisioned as having the capacity of a domestic water pump system, accommodating water volumes of approximately four to six gallons per minute. If the pump 22 is separately submersible within compartment 56, a third outlet 64 having a ball and valve assembly (as described above) is provided between the wall of the compartment and the storage volume of the reservoir, thus extending the life of the pump and preventing corrosion and other damage to the pump 22. An externally projected lever 66 (see FIG. 1) for controlling the third outlet 64 and the ball and valve assembly is provided so that opening and closing the outlet 64 does not require removal of the intake 12 and other parts and submerging the arms and hands of the user therein.

The first outlet 18 is positioned at a profile superior to the second outlet 20 (if provided) or the drainage port 16 (if provided). The first outlet 18 includes a ball-valve assembly 38 with a lever 40 for opening and closing the ball-valve assembly 38. It is envisioned that the ball-valve assembly 38 (of the second outlet 20 and the first outlet 18 described in further detail below) comprises a plastic assembly and the lever 40 comprises a metal construction to ensure accuracy in releasing stored rainwater and increasing the durability and life span of the lever 40. Coupled to the ball-valve 38 assembly is a standard size male-style garden hose attachment (envisioned to accommodate garden hoses from 0.5 inches (½") to 0.625 inches (⅝") in diameter having a threaded external surface for receiving an internally threaded coupling of a hose. The first outlet 18 is positioned at a position sufficiently elevated so that debris or sediment is not exported with the rainwater, but not so elevated that a minimal amount of water is extractable. It is envisioned that the optimal positioning of the first outlet 18 is approximately along an imaginary horizontal midline "M—M" of the reservoir or adjacently inferior to the horizontal midline "M—M".

Referring now to FIG. 4 through FIG. 6, the removable intake 14 substantially corresponds to the superior end 26 of the reservoir 12 and is either threadably coupled or mechanically coupled (via mechanical fasteners or the like) thereto. The intake 14 receives rainwater from a down spout 100 or other similar source. The intake 14 is envisioned as approximately six inches in height with an interior dam 42, an overflow ridge 44 and an inlet 46, the inlet 46 possessing a screen 48. The interior dam 42 initially collects the rainwater from a down spout or direct rainfall. Any sediment or silt will sink to the bottom of the dam 42. As rainwater is collected, the volume will rise and flow over the ridge 44 and into the inlet 46. The dam 42 is inclined as it rises toward the ridge 44. The water will pass through the screen 48, with large debris (such as sticks, limbs, leaves, and paper waste, for instance) will be caught by the screen 48, thereby preventing clogging of the outlets 18 and 20 or the drainage port 16. The rainwater will pass through the screen 48 and will reside in the reservoir 12 until use necessitates export of the water. Any silt or sediment collected by the dam 42 (and that is not carried by the water into the reservoir 12) may be removed from the intake 14 by removal of the intake and cleaning. Also, the screen 48 may be cleared of any debris at that time. The walls 50 on the screen side of the ridge 44 are envisioned as being inclined so that rainwater is funneled into and through the screen 48, and then passing through at least one aperture 52 and into the reservoir 12.

The embodiment depicted by the figures envisions a bell-shape silhouette reservoir 12 (as seen from the front), with a flat rear side so that abutment against a building is achieved. The external surface 30 is arched or has a curvilinear form from the rear side. This configuration provides more storage volume near the base of the reservoir 12 while also providing weight and balance to the apparatus 10 overall.

2. Operation of the Preferred Embodiment

A user will place the flat rear side of the apparatus 10 against or adjacent to a building. Any down spout or eave that permits the flow of rainwater is aligned so that the rainwater is received by the intake 14 at the dam 42. As the water collects and rises above the ridge 44, the water will filter through the screen 48, with any large debris inhibited from entering the reservoir 12. The rainwater is stored in the reservoir 12 until necessity requires export of the rainwater through the outlets 18 or 20, or through drainage port 16.

It is further envisioned that a plurality of the apparatuses 10 may be coupled about the overflow ports 24 via a hose coupled thereto and the free end placed to permit egress of the rainwater into the intake 14 of the adjacent apparatus 10.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents. Therefore, the scope of the invention is to be limited only by the following claims.

What is claimed is:

1. A rainwater collection apparatus comprising:
   a reservoir storing rainwater;
   an intake removably attachable to a superior end of said reservoir, said intake having a screen for segregating debris from said reservoir;
   a first outlet for egress of stored rainwater; and
   a second outlet for egress of collected rainwater wherein said second outlet is operatively coupled with a pump for exporting water, wherein said pump is placed into a separate storage compartment and operatively coupled with a third outlet, said third outlet opened and closed by an externally projected lever therefrom.

2. The apparatus of claim 1 wherein said intake is threadably attached to said superior end.

3. The apparatus of claim 1 wherein said reservoir comprises an upper section superior to a lower section, said upper section secured to said lower section.

4. The apparatus of claim 1 further comprising a drainage port adjacent an inferior end of said reservoir, said drainage port having a corresponding drainage port plug.

5. The apparatus of claim 1 wherein said pump is submersible.

6. A rainwater collection apparatus comprising:
   a reservoir storing rainwater;
   an intake removably attachable to a superior end of said reservoir, said intake having a screen for segregating debris from said reservoir, and wherein said intake is threadably attached to said superior end, wherein said intake comprises:
   an interior dam;
   an inlet adjacent to said interior dam, said inlet having a screen for inhibiting ingress of debris; and
   an overflow ridge bisecting said interior dam and said inlet, said interior dam inclined toward said ridge so as to urge rainwater thereto; and
   a first outlet for egress of stored rainwater.

7. The apparatus of claim 6 wherein said inlet is bound by inclined walls to urge rainwater through said screen.

8. The apparatus of claim 6 wherein said first outlet is positioned at a profile superior to a second outlet.

9. The apparatus of claim 6 wherein said first outlet comprises a ball-valve assembly opened and closed by a lever.

10. The apparatus of claim 9 wherein said ball-valve assembly includes a male coupler threadably receiving attachment to a garden hose.

11. The apparatus of claim 6 further comprising at least one overflow port adjacent said superior end of said reservoir, said at least one overflow port allowing overflow rainwater to egress in a controlled manner.

* * * * *